United States Patent [19]

Brainerd, Jr. et al.

[11] Patent Number: 5,033,563

[45] Date of Patent: Jul. 23, 1991

[54] APPARATUS FOR WEIGHING A PATIENT ON A STRETCHER

[75] Inventors: Robert A. Brainerd, Jr., Cheshire, Conn.; James J. DeMasters, Elmhurst, N.Y.

[73] Assignee: Cardinal Scale Manufacturing Company, Webb City, Mo.

[21] Appl. No.: 275,819

[22] Filed: Jun. 22, 1981

Related U.S. Application Data

[62] Division of Ser. No. 687,641, May 18, 1976.

[51] Int. Cl.⁵ .................. G01G 19/52; G01G 19/14; G01G 21/22
[52] U.S. Cl. .................................. 177/132; 177/147; 177/263
[58] Field of Search ............... 177/132, 144, 147, 229, 177/263

[56] References Cited

U.S. PATENT DOCUMENTS

| | | | |
|---|---|---|---|
| 2,990,899 | 7/1961 | De Bella | 177/245 UX |
| 3,032,131 | 5/1962 | Schmerl | 177/146 X |
| 3,193,035 | 7/1965 | Ferro | 177/211 X |
| 3,556,237 | 1/1971 | Allison | 177/211 X |
| 3,894,592 | 7/1975 | Andersson et al. | 177/211 X |
| 3,913,690 | 10/1975 | Hutchings et al. | 177/147 X |

OTHER PUBLICATIONS

The Toledo Bed Scale, Printed in U.S.A.-0370, Form GI-300, Toledo Scale Company of Canada Windsor, Ontario, Canada.

*Primary Examiner*—George H. Miller, Jr.
*Attorney, Agent, or Firm*—Z. T. Wobensmith, III

[57] ABSTRACT

This apparatus includes a wheeled base adapted to roll under a hospital bed, an upright at one end of the base and a T-bar adapted to extend over the hospital bed. Suspended from the T-bar is a frame mounted for limited swinging movement and adapted to engage the side rails of a stretcher. Load cells in the swinging frame measure the weight of a patient on the stretcher, and are connected to indicator means mounted on the upright.

1 Claim, 5 Drawing Sheets

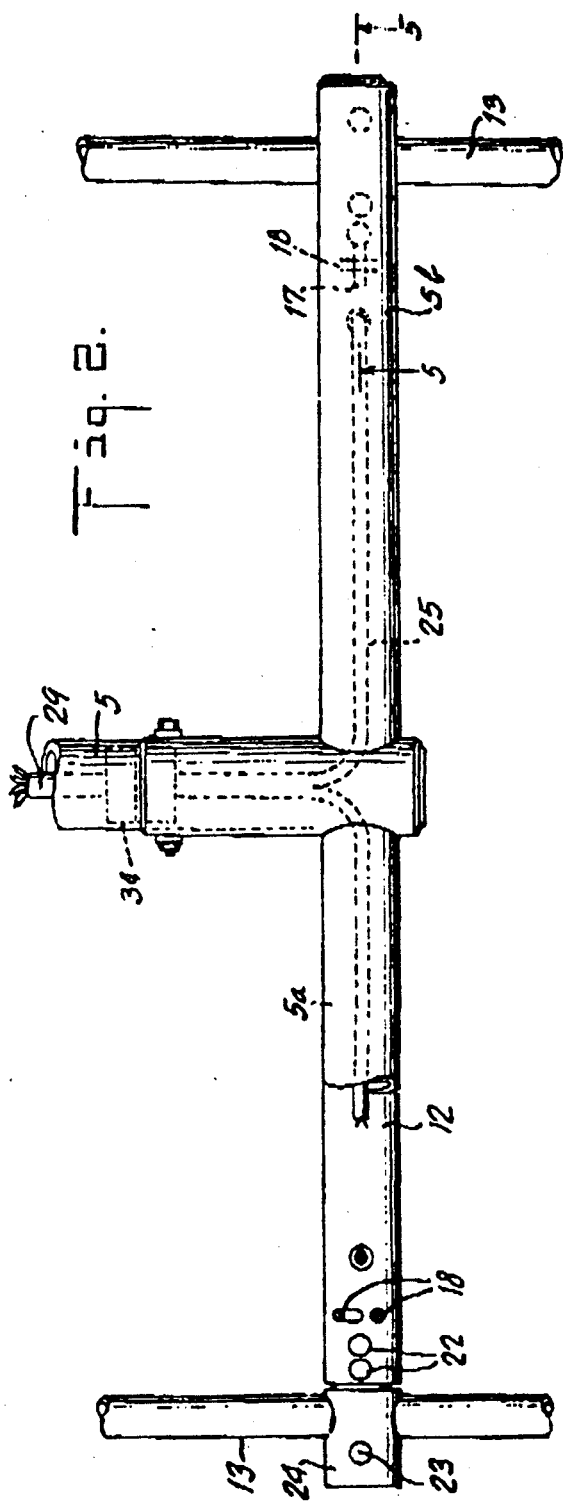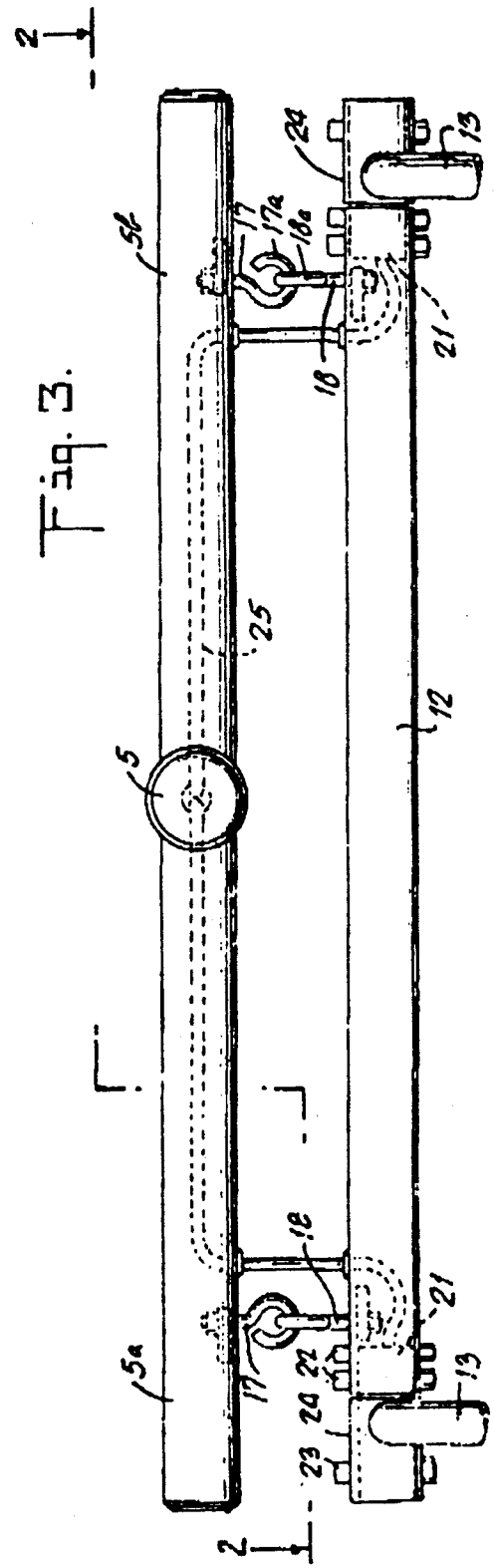

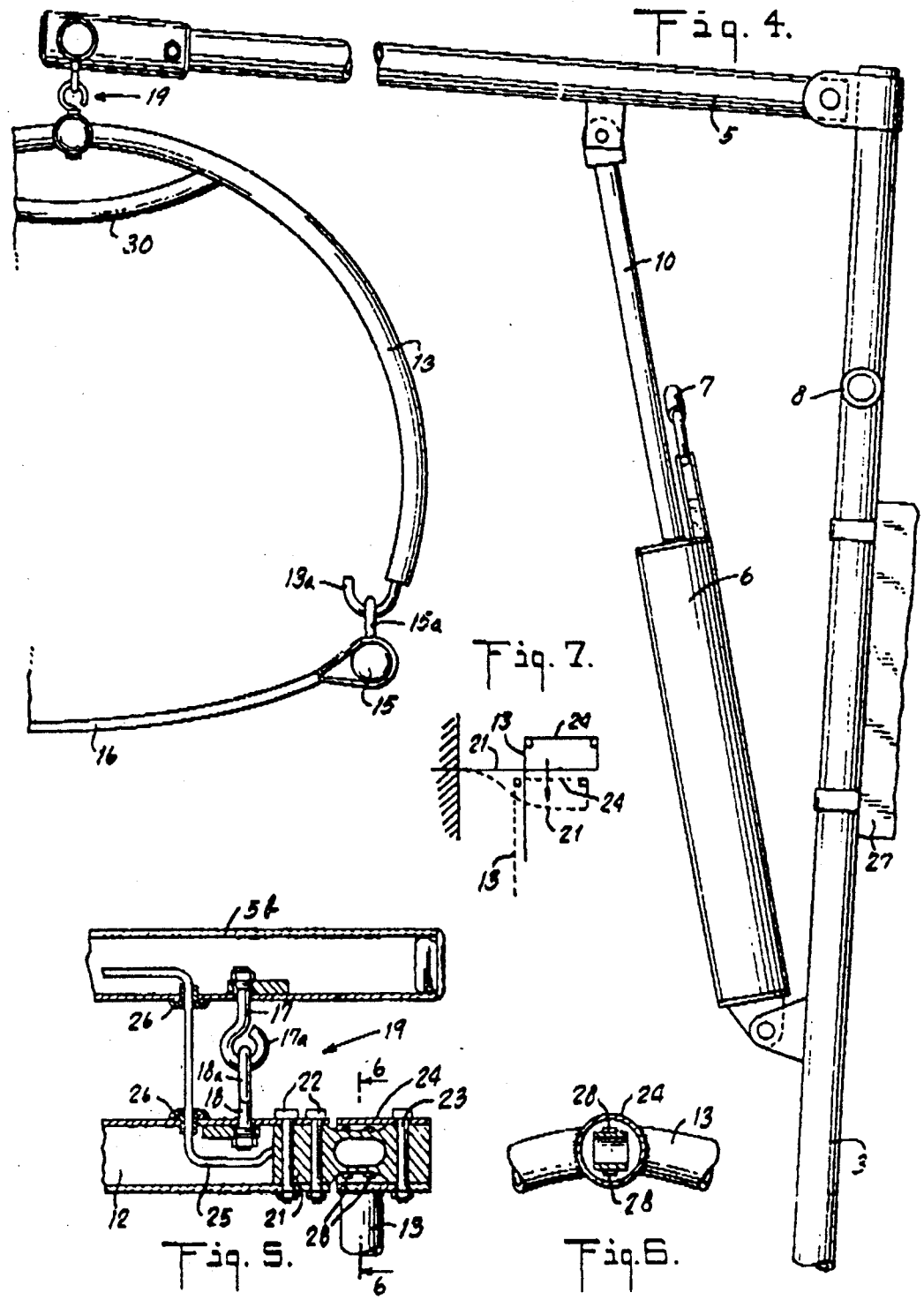

APPARATUS FOR WEIGHING A PATIENT ON A STRETCHER

This is a division of application Ser. No. 687,641, filed May 18, 1976.

BRIEF SUMMARY

The weighing apparatus of the invention includes a supporting frame which is stationary during weighing and comprises a base having an upright mounted on one end. The other ends of the base can be rolled under the bed of the patient to be weighed, and locked in place. The supporting frame also includes a T-bar projecting over the base. A supported frame is mounted at the projecting end of the T-bar.

The supported frame includes an elongated member, and a pair of spaced yokes adapted to span a stretcher at longitudinally spaced locations. The middle of each yoke is connected to the elongated member.

Two articulated connections are provided between the member and the wings of the T-bar to allow the supported frame to swing a limited distance. Load cell means are provided for measuring the load supported by the yokes. An indicator of that load is connected to the load cell means and is mounted on the upright.

DRAWINGS

FIG. 2 is a view of a fragment of the apparatus of FIG. 1, partly in plan and partly in section, taken on the line 2—2 of FIG. 3.

FIG. 3 is a fragmentary elevational view of the parts shown in FIG. 2.

FIG. 4 is another fragmentary elevational view of part of the apparatus of FIG. 1.

FIG. 5 is a fragmentary sectional view taken on the line 5—5 of FIG. 2.

FIG. 6 is a fragmentary cross-sectional view, taken on the line 6—6 of FIG. 5.

FIG. 7 is a diagram illustrating the operation of the load cell in FIG. 5.

DETAILED DESCRIPTION

Figure 1:
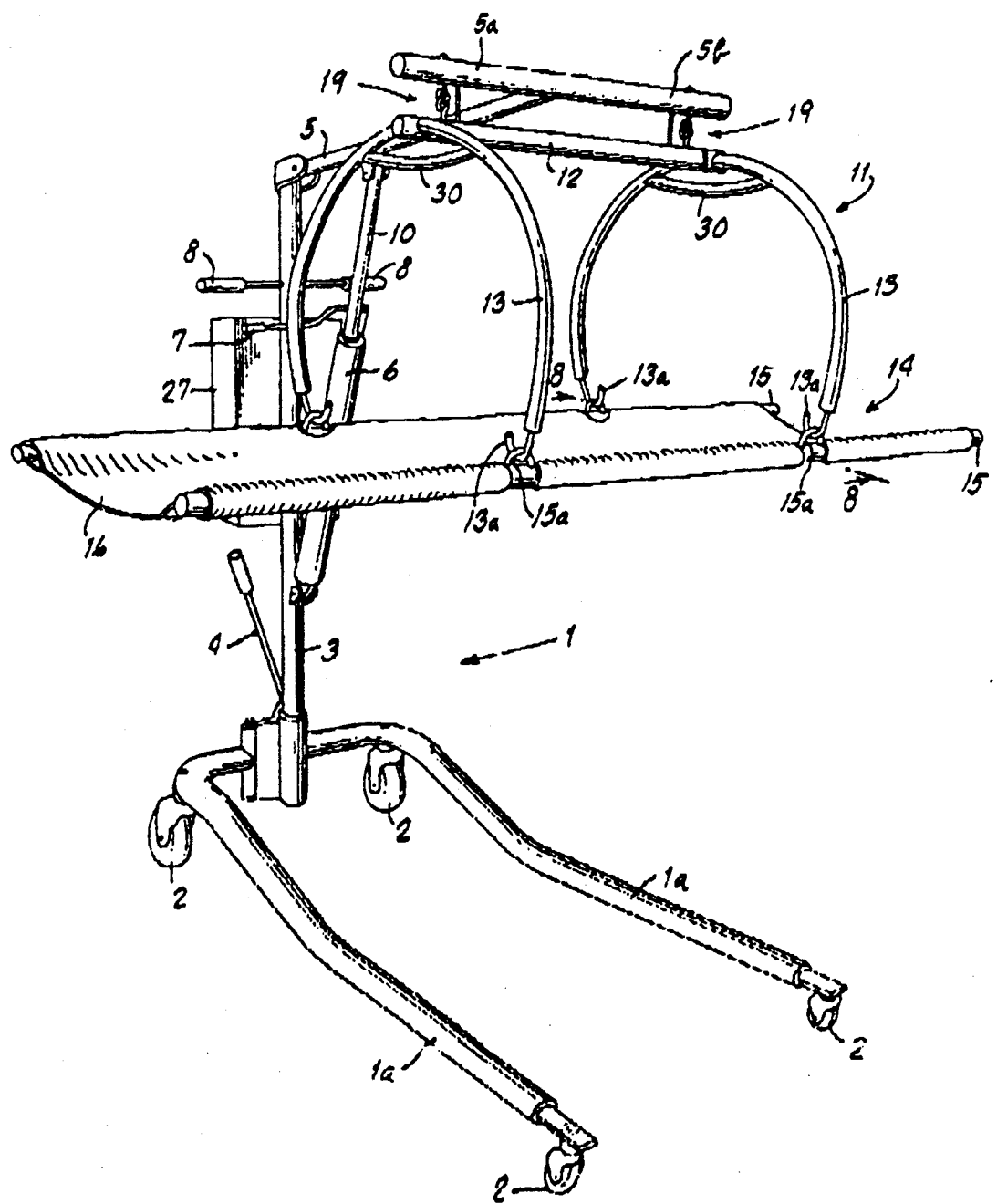
FIG. 1 is a perspective view of a weighing apparatus embodying the invention.

The apparatus includes a supporting frame 1 which is stationary during the weighing operation. This frame includes a U-shaped base is supported by four casters 2 and an upright 3 extending upwardly from the closed end of the U-shaped base. A braking mechanism (not shown) consists of locks for the caster wheels. A mechanism (not shown) is operated by a handle 4 and is effective to spread the arms of the base to make it more stable after it has been properly located with respect to the bed of the patient to be weighed.

A T-bar 5 has the stem end of the T pivotally attached to the upper end of the upright 3. The wings 5a, 5b of the T extend horizontally from the end of the stem remote from the upright 3. Means are provided for raising and lowering the T-bar, including a hydraulic cylinder 6 operated by a handle 7 and having a piston rod 10 pivotally connected to the T-bar 5. The lower end of the cylinder 6 is pivotally connected to the upright 3.

The apparatus is provided with a pair of handles 3 extending horizontally from the upright 3 at a convenient height to facilitate pushing of the weighing apparatus during movement thereof from one bed to another.

A supported frame, generally indicated at 11 is supported on the wings 5a and 5b of the T-bar 5. The frame 11 includes an elongated member 12 and a pair of yokes 13 spaced along the member 12 and adapted to span a stretcher 14 at longitudinally spaced locations. The stretcher 14 includes side rails 15 and a flexible web 16 supported by the side rails.

The elongated member 12 is supported on the wings 5a, 5b of the T-bar by a pair of articulated connections 19, best seen in FIG. 3. Each connection 19 includes one screw-eye 17 having a threaded end suitably affixed in one of the wings 5a, 5b of the T-bar and another screw-eye 18 having a threaded end fixed in the elongated member 12. The eyes (17a, 18a) of each pair of screw-eyes 17 and 18 are linked together and allow swinging movement of the frame 11 either in the longitudinal direction (i.e., the direction of the member 12) or in the transverse direction, (i.e., at right angles to the member 12).

Each end of each yoke 13 is provided with a hook 13a adapted to be inserted through a hole 51a in one of the side rails 15. The hooks 13a may face either inward or outward. An outward orientation is preferred, as being less likely to engage the patient accidentally.

In using the apparatus, the first step is to roll or otherwise move the patient onto the stretcher 14. The apparatus is then moved into place with the hooks 13a approximately aligned with the loops 15a on the stretcher. The articulated connections 19 accommodate these minor misalignments. After the hooks are connected with loops 15a, the hydraulic cylinder is actuated by the handle 7 to tilt the T-bar 5 upwardly and lift the swinging frame 11 so that the patient is supported by the yokes 13. During this movement, the connections 19 allow the swinging frame to move and accommodate any misalignment between the yokes 13 and the loops 15a. Nevertheless, any such swinging movement is accomplished without tilting the patient longitudinally from the horizontal.

During a lateral swing of the stretcher, one rail 15 of the stretcher may be higher than the other rail. Nevertheless, such lateral swinging movements are necessarily small and cannot progress very far from the location where the patient's center of gravity is vertically below the connection 19. Consequently, the patient is always stably supported during the weighing operation.

Fixed in each end of the member 12 is one end of a load cell 21 (FIG. 5) which may be held in place by a pair of bolts 22. The load cell 21 projects beyond the end of the member 12. The outer end of the load cell is connected by a bolt 23 to a sleeve 24, which encloses the projecting end of the load cell.

The load cell is preferably of the electrical resistance strain gage type, and includes a plurality of strain responsive resistance elements 28 which may be connected by wires cabled together as shown at 25 and extending through appropriate bushings 26 in the member 12 and the wings 5a, 5b of the T-bar. The wires 25 are connected through a quick detachable connector 34, located in the stem of the T-bar, and wires 29 to an electrical indicating means shown generally at 27.

The ends of yokes 13 are fixed as by brazing or welding, to the sleeves 24, and thereby to the projecting ends of the load cells 21. Each yoke 13 is provided with an arcuate stiffener 30 which extends between the arms of the yoke at the opposite side of the sleeve 24, as best seen in FIG. 1.

The sleeve 24 extends inwardly from the outer end of the load cell, and the yoke 13 is fixed to the sleeve 24 at a locality between the ends of the load cell. Consequently, the load cell and the sleeve cooperatively respond to a load on the yoke as a folded cantilever beam. The yoke is moved only slightly inwardly by the deflection of the load cell and sleeve. The yoke remains substantially vertical, and the angle at which it acts on the load cell remains substantially constant. Hence, no nonlinearity is introduced into the load cell response by a change in that angle.

The functioning of the load cell 21 and sleeve 24 as a folded cantilever beam is illustrated diagrammatically in FIG. 7, where the load cell 21, sleeve 24, and yoke 13 are represented by correspondingly numbered lines. The unloaded positions of those elements are shown in full lines, and their loaded positions in dotted lines. The vertical separation between the full lines and dotted lines is exaggerated to increase the clarity of the drawing. It may be seen that the yoke 13 moves slightly to the left under load, but does not change substantially from a vertical orientation.

The load cells are provided with electrical energy from a battery located in the casing of the indicator 27. Provision may be made for recharging the battery.

The load cells 21 are stressed by the load of a patient on the stretcher 14, and measure that load by producing an electrical signal varying as a function of that stress. That signal is communicated to the indicating means 27, where it is displayed on a suitable readout (not shown). Compensation for the torc weight of the yokes 13 and stretcher 14 may be provided.

Although electrical load cells and indicating means are shown, it is possible to use hydraulic load cells and indicating means as alternatives.

The member 12 is substantially equal in length to the distance between the ends of the wings 5a, 5b, and the connections 19 are adjacent the ends of the member 12. By making the span between the connections 19 as great as conveniently possible, it is assured that any unbalance of the load between the connections 12 and between the load cells 21 is minimized.

FIGS. 9 AND 10

Figure 8:
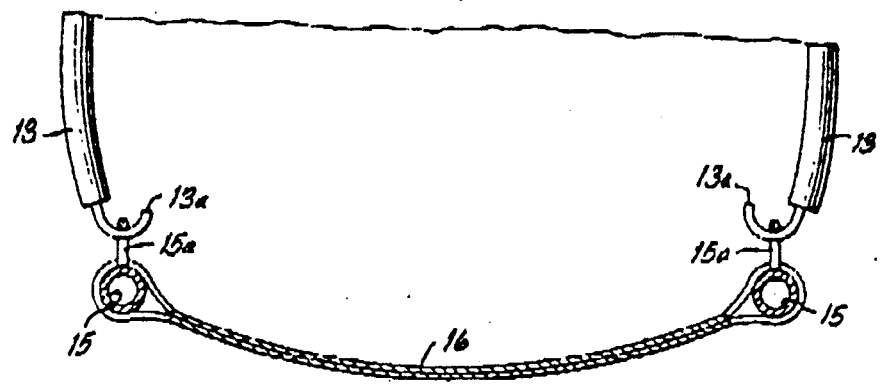
FIG. 8 is a cross-sectional view taken on the line 8—8 of FIG. 1.
Figure 9:
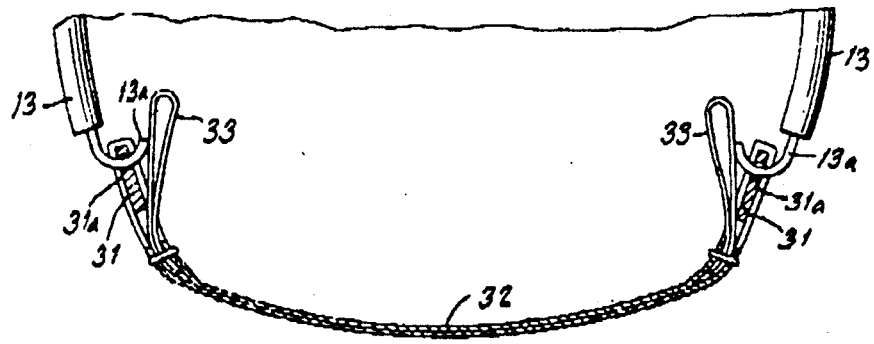
FIG. 9 is a view similar to FIG. 8, showing a modification.
Figure 10:
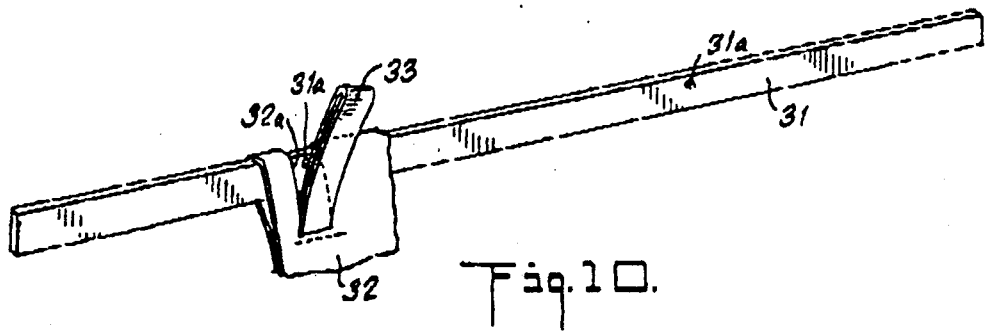
FIG. 10 is a perspective view of a stretcher rail and a web connection as in FIG. 9.

These figures illustrate a modification of the apparatus of FIGS. 1 and 8, in which the rails 15, which are in the form of hollow tubes, are replaced by rails 31 in the form of bars of rectangular cross-section. Instead of having upwardly projecting loops 15a, as in FIG. 1, each bar is apertured, as at 31a, to receive the hooks 13a. The material of the web 32 is cut away at 32a so as to provide an aperture in the margin of the web, through which the hook 13a may pass. A loop 33, which may be of the same web material, is sewed to the end of the aperture 32a. The four loops, two on each side of the stretcher, form a convenient means for lifting the stretcher when it is not supported on the weighing apparatus. Furthermore, when the stretcher is on the weighing apparatus, the loops 33 extend upwardly inside the hooks 13a, as clearly seen in FIG. 9, thereby protecting the patient against contact with the hooks.

Load cells may alternatively be placed in the supporting frame 1 instead of the supported frame 11. For example, two load cells might be placed in the ends of the wings 5a, 5b of the T-bar 5, or a single cell might be placed in the stem of the T-bar. Alternatively, the load cells might be placed in the articulated connections 19 between the two frames.

FIG. 11

This figure illustrates, somewhat diagrammatically, a modification constructed in accordance with the preceding sentence. The parts in this figure which correspond to those in the preceding figures, particularly FIG. 5, have been given the same reference numerals and will not be further described. In this figure, a load cell 41 is connected in a lower screw eye 42 which is used in place of the screw eye 18 of FIG. 5. The screw eye 42 forms a part of the articulated connection 19. The lower end 42a of the screw eye 42 is attached to the elongated member 12. The yoke 13 is connected to the end of the member 12 in the same way that the yoke 13 is connected to the sleeve 24 in FIG. 6. The load cell is connected electrically by wires 25, as in FIG. 5.

Figure 11:
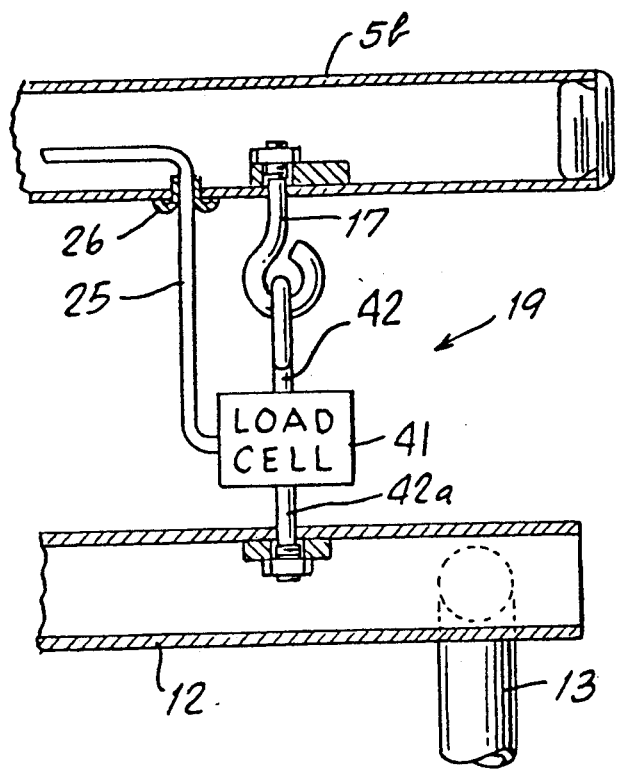
FIG. 11 is a somewhat diagrammatic illustration corresponding generally to FIG. 5 and showing a modified embodiment of the invention.

The modification shown in FIG. 11 has an advantage over the modification shown in FIG. 5. When the apparatus is being wheeled, as for example, from room to room in a hospital, the stretcher 16 and the yokes 13 sometimes are bumped into doorways or other objects which they may be passing. In the arrangement shown in FIG. 5, the impacts due to such encounters are necessarily transmitted through the load cells 21 to the elongated member 12 which swings on the articulated connections 19. In the apparatus illustrated in FIG. 11, the impacts are transmitted to the elongated member 12 without passing through the load cells. The supported frame 11, then swings on the articulated connections 19. Those impacts are transmitted directly to the elongated member 12 and do not stress the load cells 43. It has been found that repeated stresses of this sort can have adverse effects on the performance of the load cells. Those adverse effects can be avoided by the use of the modification of FIG. 11.

We claim:
1. Apparatus for weighing a patient on a stretcher, comprising:
   (a) a supporting frame stationary during weighing, comprising:
      (1) a base;
      (2) an upright at one end of the base;
      (3) a T-bar having the stem of the T supported on the upright and projecting over the base and having wings of the T extending horizontally from the projecting end of the stem; and
      (4) means for raising and lowering at least the projecting end of the T-bar;
   (b) a supported frame hanging from the supporting frame during weighing, comprising:
      (1) an elongated member;
      (2) a pair of spaced yokes, each adapted to span a stretcher at longitudinally spaced locations and operatively engage points on opposite sides sides thereof; and
      (3) means connecting the middle of each yoke to the member;
   (c) two articulated connections between the elongated member and the wings of the T-bar to accommodate swinging of the supported frame;
   (d) load cell means in said articulated connections for measuring the load supported by said yokes; and
   (e) indicator means operated by said load cell means.

* * * * *

UNITED STATES PATENT AND TRADEMARK OFFICE
CERTIFICATE OF CORRECTION

PATENT NO. : 5,033,563

DATED : July 23, 1991

INVENTOR(S) : Robert A. Brainerd, Jr., et al

It is certified that error appears in the above-identified patent and that said Letters Patent is hereby corrected as shown below:

Column 3:

Line 39, "torc" should be -- tare --.

Signed and Sealed this

Twenty-sixth Day of November, 1991

Attest:

HARRY F. MANBECK, JR.

*Attesting Officer*  *Commissioner of Patents and Trademarks*